(12) United States Patent
Lees et al.

(10) Patent No.: US 10,095,518 B2
(45) Date of Patent: Oct. 9, 2018

(54) ALLOWING DELETION OF A DISPATCHED INSTRUCTION FROM AN INSTRUCTION QUEUE WHEN SUFFICIENT PROCESSOR RESOURCES ARE PREDICTED FOR THAT INSTRUCTION

(71) Applicant: ARM LIMITED, Cambridge (GB)

(72) Inventors: Andrew James Antony Lees, Cambridge (GB); Ian Michael Caulfield, Cambridge (GB); Peter Richard Greenhalgh, Cambridge (GB)

(73) Assignee: ARM Limited, Cambridge (GB)

( * ) Notice: Subject to any disclaimer, the term of this patent is extended or adjusted under 35 U.S.C. 154(b) by 275 days.

(21) Appl. No.: 14/941,840

(22) Filed: Nov. 16, 2015

(65) Prior Publication Data

US 2017/0139708 A1    May 18, 2017

(51) Int. Cl.
*G06F 9/30* (2018.01)
(52) U.S. Cl.
CPC .................. *G06F 9/3016* (2013.01)
(58) Field of Classification Search
CPC .................................................... G06F 9/3016
USPC ....................................... 712/208, 216, 219
See application file for complete search history.

(56) References Cited

U.S. PATENT DOCUMENTS

| | | | | |
|---|---|---|---|---|
| 2004/0128476 A1* | 7/2004 | Nuckolls | ............. | G06F 9/30036 712/206 |
| 2007/0028078 A1* | 2/2007 | Harris | .................... | G06F 9/3814 712/214 |
| 2007/0113059 A1* | 5/2007 | Tran | ........................ | G06F 9/325 712/241 |
| 2007/0204137 A1* | 8/2007 | Tran | .................... | G06F 9/30181 712/214 |
| 2010/0100709 A1* | 4/2010 | Yoshida | ................ | G06F 9/3802 712/205 |

* cited by examiner

*Primary Examiner* — Yuqing Xiao
(74) *Attorney, Agent, or Firm* — Nixon & Vanderhye P.C.

(57) ABSTRACT

Instruction queue circuitry maintains an instruction queue to store fetched instructions. Instruction decode circuitry decodes instructions dispatched from the queue. The instruction decode circuitry allocates processor resource(s) for use in execution of the decoded instruction. Detection circuitry detect, for an instruction to be dispatched from a given instruction queue, a prediction indicating whether sufficient processor resources are predicted to be available for allocation to that instruction by the instruction decode circuitry. Dispatch circuitry dispatches an instruction from the queue to the instruction decode circuitry and allows deletion of the dispatched instruction from that instruction queue when the prediction indicates that sufficient processor resources are predicted to be available for allocation to that instruction by the instruction decode circuitry.

18 Claims, 5 Drawing Sheets

ALLOWING DELETION OF A DISPATCHED INSTRUCTION FROM AN INSTRUCTION QUEUE WHEN SUFFICIENT PROCESSOR RESOURCES ARE PREDICTED FOR THAT INSTRUCTION

BACKGROUND

This disclosure relates to data processing.

Data processing arrangements can make use of pipelined decoding and execution of instructions. The decoding process involves, as part of its functionality, allocating processor resources to the decoded instructions. The processor resources may be, for example, processor registers or register mappings and/or entries in buffers or the like such as re-order buffers, renaming lists or reservation stations.

If, at decoding, insufficient processor resources are available, the decoding of an instruction is stalled and may be cancelled. But the determination of resource availability cannot be made until late in the decoding cycle.

SUMMARY

In an example arrangement there is provided data processing circuitry comprising:

instruction queue circuitry to maintain one or more instruction queues to store fetched instructions;

instruction decode circuitry to decode instructions dispatched from the one or more instruction queues, the instruction decode circuitry being configured to allocate one or more processor resources of a set of processor resources to a decoded instruction for use in execution of that decoded instruction; detection circuitry to detect, for an instruction to be dispatched from a given instruction queue, a prediction indicating whether sufficient processor resources are predicted to be available for allocation to that instruction by the instruction decode circuitry; and dispatch circuitry to dispatch an instruction from the given instruction queue to the instruction decode circuitry, the dispatch circuitry being responsive to the detection circuitry to allow deletion of the dispatched instruction from that instruction queue when the prediction indicates that sufficient processor resources are predicted to be available for allocation to that instruction by the instruction decode circuitry.

In another example arrangement there is provided data processing circuitry comprising:

instruction queue circuitry to maintain one or more instruction queues to store fetched instructions;

instruction decode circuitry to decode instructions dispatched from the one or more instruction queues, the instruction decode circuitry being configured to allocate one or more processor resources of a set of processor resources to a decoded instruction for use in execution of that decoded instruction;

detection circuitry to detect, for an instruction to be dispatched from a given instruction queue, a prediction indicating whether sufficient processor resources are predicted to be available for allocation to that instruction by the instruction decode circuitry; and dispatch circuitry to dispatch an instruction from the given instruction queue to the instruction decode circuitry, the dispatch circuitry being responsive to the detection circuitry to retain the dispatched instruction in that instruction queue when the prediction indicates that insufficient processor resources are predicted to be available for allocation to that instruction by the instruction decode circuitry.

In another example arrangement there is provided a data processing method comprising:

storing fetched instructions in one or more instruction queues;

decoding instructions dispatched from the one or more instruction queues the decoding step comprising allocating one or more processor resources of a set of processor resources to a decoded instruction for use in execution of that decoded instruction; detecting, for an instruction to be dispatched from a given instruction queue, a prediction indicating whether sufficient processor resources are predicted to be available for allocation to that instruction by the decoding step; and dispatching an instruction from an instruction queue for decoding; and allowing deletion of the dispatched instruction from the given instruction queue when the prediction indicates that sufficient processor resources are predicted to be available for allocation to that instruction by the decoding step.

In another example arrangement there is provided a data processing method comprising:

storing fetched instructions in one or more instruction queues;

decoding instructions dispatched from the one or more instruction queues the decoding step comprising allocating one or more processor resources of a set of processor resources to a decoded instruction for use in execution of that decoded instruction; detecting, for an instruction to be dispatched from a given instruction queue, a prediction indicating whether sufficient processor resources are predicted to be available for allocation to that instruction by the decoding step; and dispatching an instruction from an instruction queue for decoding; and retaining the dispatched instruction in that instruction queue when the prediction indicates that insufficient processor resources are predicted to be available for allocation to that instruction by the decoding step.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
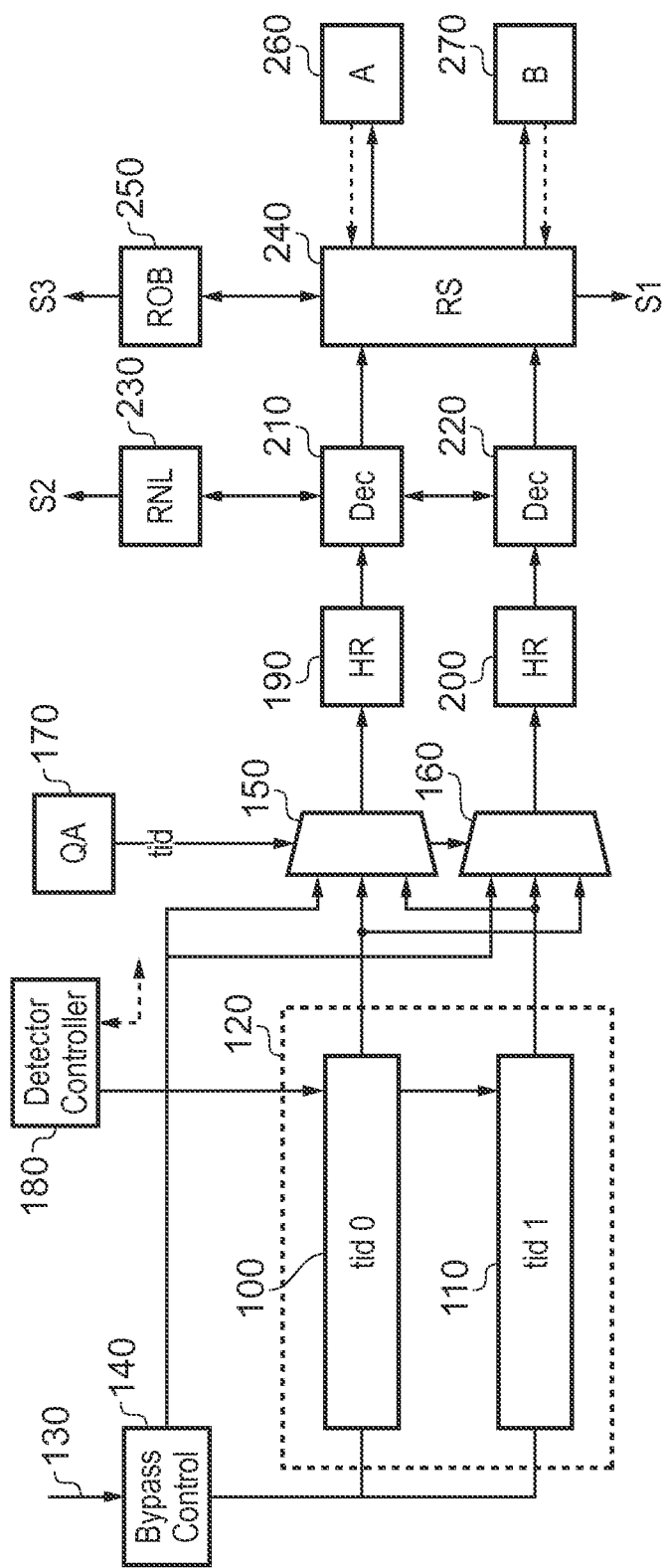
FIG. 1 schematically illustrates an instruction decoding pipeline as part of data processing circuitry.

Before discussing the embodiments with reference to the accompanying figures, the following description of embodiments is provided.

An example embodiment provides data processing circuitry comprising:

instruction queue circuitry to maintain one or more instruction queues to store fetched instructions;

instruction decode circuitry to decode instructions dispatched from the one or more instruction queues, the instruction decode circuitry being configured to allocate one or more processor resources of a set of processor resources to a decoded instruction for use in execution of that decoded instruction;

detection circuitry to detect, for an instruction to be dispatched from a given instruction queue, a prediction indicating whether sufficient processor resources are predicted to be available for allocation to that instruction by the instruction decode circuitry; and dispatch circuitry to dispatch an instruction from the given instruction queue to the instruction decode circuitry, the dispatch circuitry being responsive to the detection circuitry to allow deletion of the dispatched instruction from that instruction queue when the prediction indicates that sufficient processor resources are predicted to be available for allocation to that instruction by the instruction decode circuitry.

Example embodiments provide a speculative dispatch mechanism in dependence upon a prediction of whether sufficient processor resources are predicted to be available, for example (in some embodiments) being a prediction of whether an instruction will stall at decoding. This can allow for an instruction to be retried if it then does fail, because it will still be present in the relevant queue. But the use of the prediction gives the feature that extra space is not held in the queue unless the prediction indicates a possibility of a lack of resources, which in turn provides the advantage of avoiding the need for a larger queue (which would be necessary if every instruction were speculatively dispatched). Similarly, the present techniques can avoid the need for additional buffering.

As an alternative to allowing the deletion of an instruction, the dispatch circuitry may be configured to retain a dispatched instruction in that instruction queue when the prediction indicates that insufficient processor resources are predicted to be available for allocation to that instruction by the instruction decode circuitry.

In example embodiments, and the instruction decode circuitry is configured to stall the decoding of an instruction when insufficient processor resources are available for allocation to that instruction.

Example embodiments can provide two or more instruction queues; and queue arbiter circuitry to select one of the instruction queues for a next instruction dispatch by the dispatch circuitry. The present disclosure can be useful in such circumstances to allow the sharing of allocable resources by instructions from the different queues. For example, each queue may correspond to a respective processor thread.

In example embodiments, the queue arbiter circuitry is configured, in response to an instruction from one of the instruction queues being stalled, to select another one of the instruction queues for instruction dispatch, for example another one of the instructions queues which has one or more instructions currently queued for dispatch. In such a situation the instruction decode circuitry is configured to cancel decoding of a currently stalled instruction from one of the instruction queues in response to dispatch of an instruction from another of the instruction queues. This provides a reason why a speculative dispatch can be useful, in that if a speculatively dispatched instruction is cancelled it can still be re-tried later.

The prediction can, in example embodiments, be arrived at as follows. The detection circuitry may be configured to detect the prediction by detecting, for an instruction to be dispatched, whether a maximum potential resource requirement of the instruction to be dispatched exceeds a minimum potential resource availability. This has the advantage of generating a "worst case" prediction. If the prediction is that there may possibly be insufficient resources, the prediction may be right or wrong (but in either event, speculative dispatch is used). If the prediction is that there will be sufficient resources, the prediction is correct and speculative dispatch does not need to be used.

For example, the detection circuitry can detect a minimum potential resource availability by detecting resources allocated to one or more decoded instructions awaiting execution. The detection circuitry can detect any resources which will become available before decoding of the instruction awaiting dispatch.

In example arrangements the detection circuitry is configured: to detect a minimum potential resource availability by detecting a maximum potential resource requirement of one or more dispatched instructions awaiting decoding; and to detect a maximum potential resource requirement of the instruction to be dispatched in dependence upon an instruction type of the instruction to be dispatched.

In other example embodiments the detection circuitry is configured: to detect a minimum potential resource availability by detecting a maximum potential resource requirement of one or more other instructions awaiting dispatch; and to detect a maximum potential resource requirement of the instruction to be dispatched in dependence upon an instruction type of the instruction to be dispatched. This is particularly useful in arrangements in which multiple instructions can be dispatched together (or in a single dispatch operation) for decoding.

In example embodiments, the dispatch circuitry is configured to allow deletion of the retained instruction in the given instruction queue in response to decoding of that instruction.

An elegantly convenient way of speculatively dispatching instructions is one in which the dispatch circuitry is configured to dispatch an instruction from an instruction queue to the instruction decode circuitry according to a read pointer indicating a read position in that instruction queue, the dispatch circuitry being responsive to the detection circuitry to set the read pointer to a position indicating that the dispatched instruction is a next instruction to be dispatched when the prediction indicates that insufficient processor resources are predicted to be available for allocation to that instruction by the instruction decode circuitry. For example, the dispatch circuitry may be configured to set a speculative read pointer indicating a next instruction after the dispatched instruction; and to move the read pointer to the position of the speculative read pointer in response to decoding of the dispatched instruction.

In order to provide an example of a similar speculative dispatch mechanism even when queue bypass is in use, in example embodiments the queue arbiter circuitry is configured, when a currently selected instruction queue is empty, to route a fetched instruction directly to the instruction decode circuitry; and the queue arbiter circuitry is configured, in response to a prediction that insufficient processor resources are predicted to be available for allocation to that instruction by the instruction decode circuitry, to store a copy of that instruction in the instruction queue. For example, the dispatch circuitry may be configured, in respect of an instruction for which a copy has been stored in the instruction queue, to set a read pointer to a position indicating that the copy instruction is a next instruction to be dispatched and to set a speculative read pointer indicating a next instruction after the copy instruction; to move the read pointer to the position of the speculative read pointer in response to decoding of the copy instruction.

Another example embodiment provides data processing circuitry comprising:

instruction queue circuitry to maintain one or more instruction queues to store fetched instructions;

instruction decode circuitry to decode instructions dispatched from the one or more instruction queues, the instruction decode circuitry being configured to allocate one or more processor resources of a set of processor resources to a decoded instruction for use in execution of that decoded instruction;

detection circuitry to detect, for an instruction to be dispatched from a given instruction queue, a prediction indicating whether sufficient processor resources are predicted to be available for allocation to that instruction by the instruction decode circuitry; and dispatch circuitry to dispatch an instruction from the given instruction queue to the instruction decode circuitry, the dispatch circuitry being responsive to the detection circuitry to retain the dispatched instruction in that instruction queue when the prediction indicates that insufficient processor resources are predicted to be available for allocation to that instruction by the instruction decode circuitry.

Another example embodiment provides a data processing method comprising:

storing fetched instructions in one or more instruction queues;

decoding instructions dispatched from the one or more instruction queues, the decoding step comprising allocating one or more processor resources of a set of processor resources to a decoded instruction for use in execution of that decoded instruction;

stalling the decoding of an instruction when insufficient processor resources are available for allocation to that instruction;

detecting, for an instruction to be dispatched from a given instruction queue, a prediction indicating whether sufficient processor resources are predicted to be available for allocation to that instruction by the decoding step;

dispatching an instruction from an instruction queue for decoding; and allowing deletion of the dispatched instruction from the given instruction queue when the prediction indicates that sufficient processor resources are predicted to be available for allocation to that instruction by the decoding step.

Another example embodiment provides a data processing method comprising:

storing fetched instructions in one or more instruction queues;

decoding instructions dispatched from the one or more instruction queues, the decoding step comprising allocating one or more processor resources of a set of processor resources to a decoded instruction for use in execution of that decoded instruction;

stalling the decoding of an instruction when insufficient processor resources are available for allocation to that instruction;

detecting, for an instruction to be dispatched from a given instruction queue, a prediction indicating whether sufficient processor resources are predicted to be available for allocation to that instruction by the decoding step;

dispatching an instruction from an instruction queue for decoding; and retaining the dispatched instruction in that instruction queue when the prediction indicates that insufficient processor resources are predicted to be available for allocation to that instruction by the decoding step.

Referring now to the drawings, FIG. 1 schematically illustrates an instruction decoding pipeline as part of a so-called out-of-order processor or data processing circuitry.

Out-of-order processing involves decoding and executing instructions according to the availability of the input data rather than necessarily the order in which the occurred can be programmed code for execution. This can provide a degree of performance improvement because each instruction has to wait primarily for its own input to be ready rather than for the proceeding instruction in the program code order to be executed. Note that the term "out-of-order" does not require that instructions are executed in an order which is different to the program code order, but that the instructions can be executed in a different order of this nature.

The example shown in FIG. 1 is a dual-threaded processor capable of executing instructions in two processor threads referred to by so-called thread identifiers (thread id, or tid) tid0 and tid1. So, each thread has a thread id. Instruction queue circuitry 120 maintains one or more instruction queues to store fetched instructions. In the example shown, the instruction queue circuitry 120 maintains two instruction queues: an instruction queue 100 relating to tid0 and an instruction queue 110 relating to tid1. Queue arbiter circuitry 170 selects one of the instruction queues for a next instruction dispatch for decoding, via multiplexers 150, 160. Instructions normally reside in an instruction queue until they can be dispatched for decoding and then execution.

Fetched instructions 130 are processed by bypass control circuitry 140. The bypass control circuitry 140 detects the current queue occupancy and routes the fetched instructions in one (or, as discussed below, both) of two ways. If the queue (relating to the thread applicable to a fetched instruction) currently contains one or more instructions awaiting dispatch, then the bypass control circuitry 140 routes the instruction to the back (most-recently-added entry) of the relevant queue. If however the relevant queue is empty, then the bypass control circuitry 140 routes the instruction directly to the multiplexers 150, 160. This avoids the power consumption and time delay of adding an instruction to an empty queue, only for it to be immediately dispatched from that queue. In embodiments of the disclosure, and as discussed in more detail below, in some circumstances the bypass control circuitry 140 does both of these, which is to say that it adds the fetched instruction to an otherwise empty queue as well as supplying it to the multiplexers 150, 160. The reason that this happens in some circumstances will be discussed further below.

Dispatch of the instructions from the queue, and the handling of queue pointers and the like including speculative read pointers (to be discussed below) are handled by detector/controller circuitry 180.

The multiplexers are therefore arranged to receive fetched instructions either directly from the bypass control circuitry, or from the instruction queue 100 for tid0, or from the instruction queue 110 for tid1. The multiplexers 150 operate under the control of a tid value (tid0 or tid1 in this example) generated by the queue arbiter circuitry 170. This means that at any instance, instructions are dispatched for either tid0 or tid1, but not both at the same time.

The outputs of the two multiplexers 150, 160 are provided to respective decode arrangements having instruction decode circuitry to decode instructions dispatched from the instruction queues 100, 110. The instruction decoder circuitry comprises a pair of holding registers 190, 200 and a pair of decode logic 210, 220. These arrangements form two decode paths. Instructions dispatched via the multiplexer 150 are, if necessary, temporarily held by the holding register 190 and decoded by the decode logic 210. Instructions dispatched via the multiplexer 160 are temporarily held, if necessary, by the holding register 200 and decoded by the decode logic 220.

The decode logic 210, 220 has access to a renaming list (RNL) 230 which maintains a list of the current or prevailing correspondence between so-called architectural registers and physical registers.

Architectural registers are those program registers specified by the instruction set architecture. Physical registers are those program registers provided by the physical execution hardware of the processor. In an out-of-order processor there may typically be a larger number of physical registers than the number of available architectural registers. When an instruction is decoded and prepared for execution, any architectural registers referenced by that instruction are mapped to available ones of the physical registers and the mapping, in terms of sets of so-called tag data, is maintained by the RNL 230. The RNL 230 can issue a stall indication (S2) in instances where the RNL has run out of available physical registers for a mapping (as required by the decoding of an instruction) to be implemented.

Decoded instructions are passed to a reservation station (RS) 240. The RS cooperates with a reorder buffer (ROB) 250 to provide: a buffer for instructions for which the results of execution have not yet been "committed", or output into the program flow after execution. Instructions are dispatched and decoded in program flow order, but may be executed in another order, so the RS and ROB cooperate to allow coordination of this process and the cross-referencing of output operands (as mapped from architectural to physical registers) of instructions earlier in the program flow to input operands of instructions later in the program flow.

In the present example, execution is performed by one of two execution engines 260, 270.

In the dual-threaded arrangement described here (as an example of a more generic multi-threaded arrangement), either decode arrangement can decode instructions for either thread. In fact, in an example mode of operation, instructions are decoded for either one thread or the other. So, at any one time, both of the decode arrangements are occupied in decoding instructions of the same thread.

Resources which are allocated at decoding are shared between the two threads.

The instruction decode circuitry is therefore operable to allocate resources to an instruction being decoded. These resources can include physical registers and one or more entries in the RNL; space in the RS, space in the ROB and so on.

The RNL can, as mentioned above, assert a stall signal S2. Other stall signals may be asserted. Examples are stall signals S1 and S3 relating to so-called structural hazards such as a lack of space in the RS or a lack of space in the ROB respectively.

Figure 2:
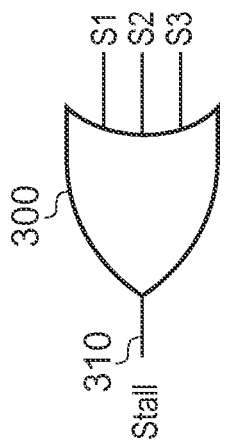
FIG. 2 schematically illustrates a stall processor.

FIG. 2 schematically illustrates the combination of the stall signals S1, S2 and S3 by a logical OR combination 300 to form a single stall indication 310.

The stall indication 310 therefore indicates that, for an instruction for which decoding is currently in progress and being attempted, there are insufficient resources currently available to be allocated to that instruction as part of the decoding process.

The instruction queues 100, 110 are arranged not to dispatch further instructions while the stall indication 310 is asserted. The instruction decode circuitry is also arranged not to proceed further with decoding an instruction when the stall indication 310 is currently asserted.

Therefore, in these examples the instruction decode circuitry is configured to allocate one or more processor resources of a set of processor resources to a decoded instruction for use in execution of that decoded instruction; and the instruction decode circuitry being configured to stall the decoding of an instruction when insufficient processor resources are available for allocation to that instruction.

It is noted that the assertion of the stall indication 310 is not made until late in a given processor cycle if (in the determination of whether sufficient processor resources are in fact available for allocation to an instruction currently being decoded) those resources released in the current cycle are to be taken into account.

A further example of the use of the stall indication 310 is as follows. The queue arbiter circuitry 170 is configured, in response to an instruction from one of the instruction queues being stalled, to select another one of the instruction queues for instruction dispatch, for example another one of the instructions queues which has one or more instructions currently queued for dispatch. In the present example there are two instruction queues. So, if a stall is experienced in respect of (say) the instruction queue for tid0, and the instruction queue for tid1 has one or more instructions awaiting dispatch, then the queue arbiter circuitry 170 selects the instruction queue for tid1 for dispatch of a pair of instructions. This in turn causes the cancellation of the currently stalled decoding of the pair of instructions for tid0 (so that, in general, the instruction decode circuitry is configured to cancel decoding of a currently stalled instruction from one of the instruction queues in response to dispatch of an instruction from another of the instruction queues). However, because of the retention of those instructions in the queue for tid0 (to be discussed below), a later attempt can still be made to dispatch and decode those instructions. Note also that if the stall indication 310 becomes de-asserted during a cycle (by virtue of resources being freed by, for example, executed instructions being committed), it is possible for any currently stalled instructions to complete their decoding rather than being cancelled.

At a general level, the way in which an instruction is dispatched from an instruction queue depends in part upon a detection of a prediction as to whether sufficient processor resources are predicted to be available for allocation to that instruction. In the examples below, the prediction is based upon a worst case requirement for resources, so that the prediction is either "yes there will be sufficient resources" or "no there may or may not be sufficient resources". If the prediction is (in the examples discussed below) that sufficient resources will be available for allocation to that instruction, then the instruction is dispatched and decoded as normal. If the prediction is that there may or may not be sufficient resources for allocation to that instruction, or in other words that a stall may (or may not) occur, then a so-called speculative dispatch technique is used so that the instruction is retained in the queue (or at least, deletion of the instruction is prevented or inhibited) while still being dispatched for decoding. If the decoding process does stall and is then cancelled, the instruction remains in the queue for another attempted dispatch. If the decoding process proceeds to completion, the speculative read from the instruction queue is considered to have been a normal read and the instruction is no longer retained in the queue (or at least, deletion of the instruction by a subsequent write operation is then allowed).

Figure 3:
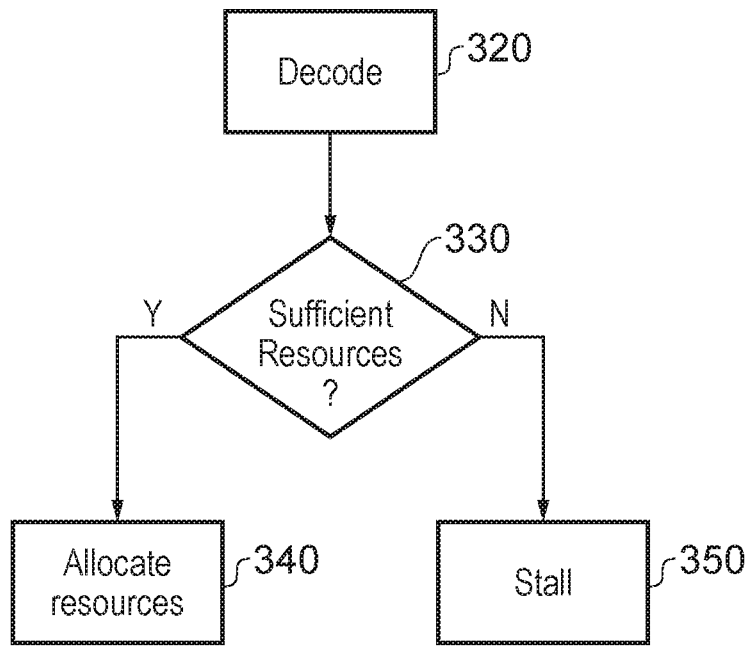
FIG. 3 is a schematic flowchart illustrating a decoding process.

FIG. 3 is a schematic flow chart illustrating a decoding process in which, at initiation 320 of the decoding process, a test is carried out at a step 330 to detect whether sufficient processor resources are available for decoding of a current instruction. If the answer is yes then resources are allocated at a step 340 to the current instruction and decoding is completed. If the answer is no then at a step 350 the decoding of the current instruction is stalled.

Figure 4:
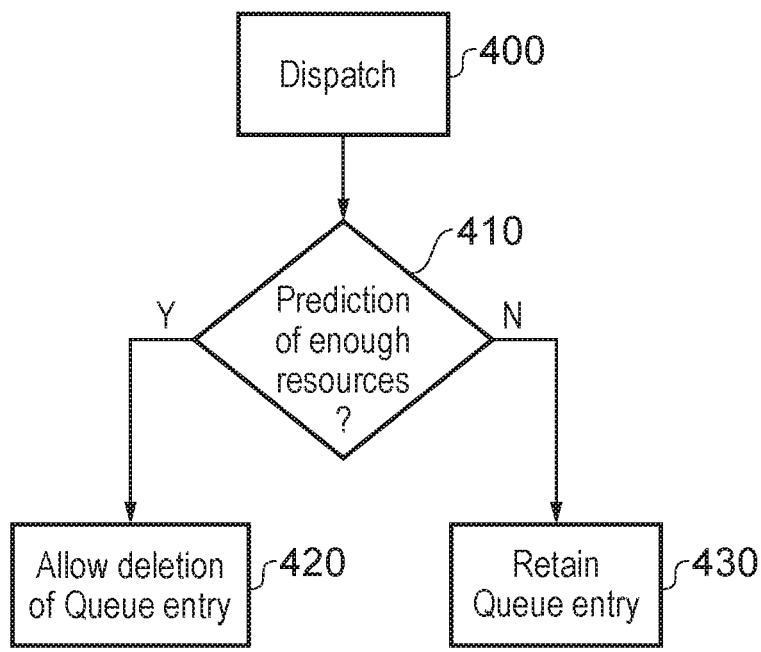
FIG. 4 is a schematic flowchart illustrating a queue handling process.

FIG. 4 is a schematic flow chart illustrating a queue handling process. As part of the process of dispatching instructions (a step 400) from an instruction queue, a prediction is made as to whether enough resources will be available (or are predicted to be available) to decode an instruction to be dispatched.

If the prediction indicates that sufficient resources will be available (or are predicted to be available) then, at a step 420, the instruction queue entry relating to that instruction is allowed to be deleted. If, however, the prediction indicates that insufficient processor resources are predicted to be available for decoding the instruction then, at a step 430, the instruction queue entry relating to that instruction is retained in the instruction queue even though the instruction can be dispatched from the instruction queue for decoding.

This therefore provides an example of the use of detection circuitry (an example of which is discussed further below) to detect, for an instruction to be dispatched from a given instruction queue, a prediction indicating whether sufficient processor resources are predicted to be available for allocation to that instruction by the instruction decode circuitry; and dispatch circuitry (for example, including the detector/controller circuitry 180) to dispatch an instruction from the given instruction queue to the instruction decode circuitry, the dispatch circuitry being responsive to the detection circuitry to allow deletion of the dispatched instruction from that instruction queue when the prediction indicates that sufficient processor resources are predicted to be available for allocation to that instruction by the instruction decode circuitry. The dispatch circuitry may be configured to retain a dispatched instruction in that instruction queue when the prediction indicates that insufficient processor resources are predicted to be available for allocation to that instruction by the instruction decode circuitry.

FIGS. 5a to 5d schematically illustrate queue pointers. Here, an example instruction queue is shown as a series of boxes 505 arranged in a row 500. This is simply for purposes of the schematic explanation and does not necessarily indicate any physical structure of the instruction queue. The boxes each represent a storage area or space to store information relating to a particular instruction, and there is an order associated with the boxes which will be described with reference to the write pointer (W) and the read pointer (R) in FIG. 5. Fundamentally, the queue may be considered as a circular buffer at which a next position for writing is indicated by the write pointer W and a next position for reading is indicated by the read pointer R. When, for example, an instruction has been read from the position indicated by the read pointer R, the read pointer advances to the next instruction in the queue, which in this schematic representation is the instruction stored in the box to the right of the current position of the read pointer. Similarly when an instruction has been written to the queue at the position of the write pointer, the write pointer moves one space to the right hand side as drawn. The write pointer cannot overtake or even reach the same position as the read pointer. If the write pointer reaches the instruction immediately preceding (in the queue order) the read pointer, the instruction queue is full. When either pointer arrives at the right-most position in FIG. 5a, its next move is to the left-most position in FIG. 5a.

Figure 5A:
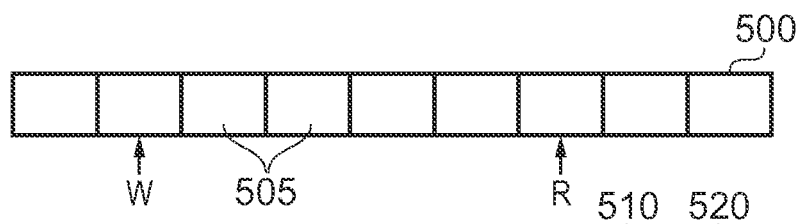
FIGS. 5a-5d schematically illustrate queue pointers.

Accordingly, FIG. 5a shows the normal operation of an instruction queue using read and write pointers.

Figure 5B:
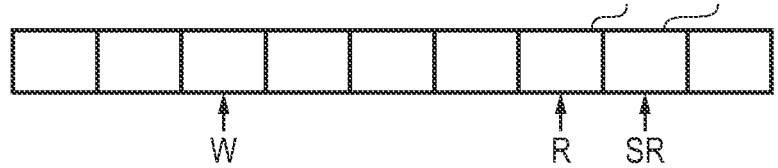
Figure 5C:
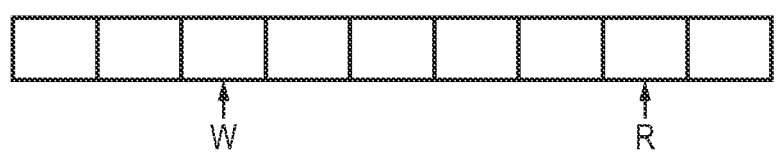
Figure 5D:
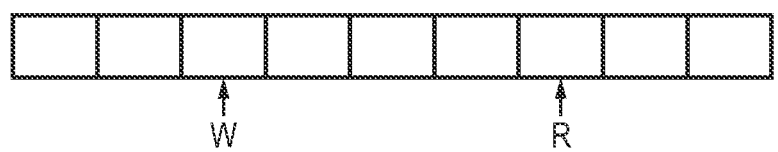

FIGS. 5b-5d relate to the use of a so-called speculative read (SR) pointer in addition to the read and write pointers. The speculative read pointer allows reading operations to continue without deleting the queued instructions from the instruction queue, or at least without deleting those queued instructions straight away. This type of operation is relevant to the use of the prediction discussed above. If the prediction indicates that sufficient processor resources are predicted to be available to decode an instruction to be dispatched from the queue, that instruction can be dispatched at the position of the read pointer, and the read pointer moved on to the next instruction in the queue order. This does not necessarily cause the deletion of that instruction from the queue but it does allow the deletion of that instruction from the queue, because it allows the write pointer to advance to the position previously occupied by that instruction such that another fetched instruction can be overwritten at that position in the queue. On the other hand, if the read pointer is not advanced this prevents the write pointer from reaching that position and prevents another instruction from being written over the dispatched instruction. In other words, by not advancing the read pointer, an instruction, even though it has been dispatched, can be retained in the instruction queue.

The speculative read pointer provides an elegantly convenient technique to handle this type of arrangement.

Referring to FIG. 5b, an instruction at a queue position 510 is read and dispatched, but in this example its dispatch is accompanied by a detection of a prediction that insufficient resources may be available at the decode stage to decode that instruction. As discussed above, this is just a prediction and, as such, it may or may not prove to be correct, or it may be a correct prediction initially but as further resources are made available, the instruction may be able to be successfully decoded after a short delay. In any event, given such a prediction (that insufficient resources may be available for decoding the instruction) the read pointer is retained at the position 510 in FIG. 5b and the speculative read pointer SR is advanced to a next queue position 520.

As discussed above, by keeping the read pointer at the position 510, or in other words by not advancing the read pointer even though the instruction at the position 510 was read and dispatched, the instruction at the position 510 is retained in the instruction queue, which is to say that its deletion is not allowed. However, the speculative read pointer SR indicates where the reading and dispatching process has got to in the instruction queue.

If the dispatched instruction from the position 510 is successfully decoded (whether immediately or after a short delay) despite the prediction that insufficient resources might have been available, then the read pointer R is advanced to the position of the speculative read pointer SR as shown in FIG. 5c. This in turn allows the deletion of the instruction at the queue entry 510 by permitting the write pointer to advance to that position such that an instruction can be written there.

If, on the other hand, the dispatched instruction fails to be decoded, then the speculative read pointer is removed (or at least moved back to the same position as that currently held by the read pointer) such that the read pointer remains at the position 510 in the instruction queue. This allows another attempt to be made, in due course, to read, dispatch and decode the instruction at the queue position 510.

This arrangement therefore provides an example of dispatch circuitry configured to dispatch an instruction from an instruction queue to the instruction decode circuitry according to a read pointer indicating a read position in that instruction queue, the dispatch circuitry being responsive to the detection circuitry to set the read pointer to a position indicating that the dispatched instruction is a next instruction to be dispatched when the prediction indicates that insufficient processor resources are predicted to be available for allocation to that instruction by the instruction decode circuitry. For example, the dispatch circuitry may be configured to set a speculative read pointer indicating a next instruction after the dispatched instruction; and to move the read pointer to the position of the speculative read pointer in response to decoding of the dispatched instruction.

Figure 6:
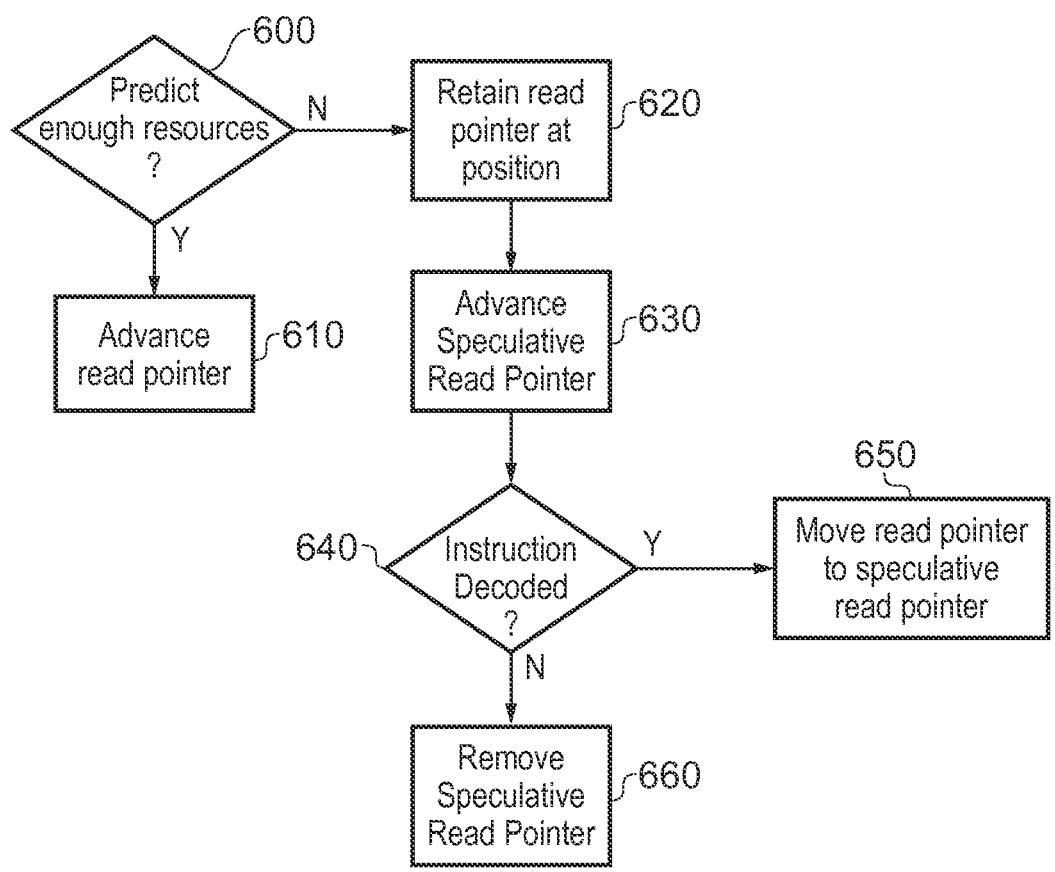
FIG. 6 is a schematic flowchart illustrating a pointer handling process.

FIG. 6 is a schematic flow chart illustrating the pointer handling process discussed above with reference to FIGS. 5a-5d. At a dispatch operation, a prediction is detected as to whether sufficient processor resources will be available for allocation to that instruction. This is carried out at a step 600. If the answer is that sufficient processor resources are predicted to be available for allocation to that instruction, then at a step 610 the read pointer is advanced to the next instruction queue position. If, however, the prediction indicates that insufficient processor resources are predicted to be available, then control passes to a step 620.

At the step 620, the read pointer is retained at its initial position (as shown in FIG. 5b) and, at a step 630 the speculative read pointer is advanced to a next read position.

At a step 640 a detection is made as to whether the dispatched instruction has in fact been successfully decoded. If the answer is yes then, as shown in FIG. 5c, at a step 650 the read pointer is moved to the position previously occupied by the speculative read pointer. If the answer is no then at a step 660 (and as shown in FIG. 5d) the speculative read pointer is returned to the position previously held by the read pointer (which in effect removes the speculative read pointer from separate consideration).

Figure 7:
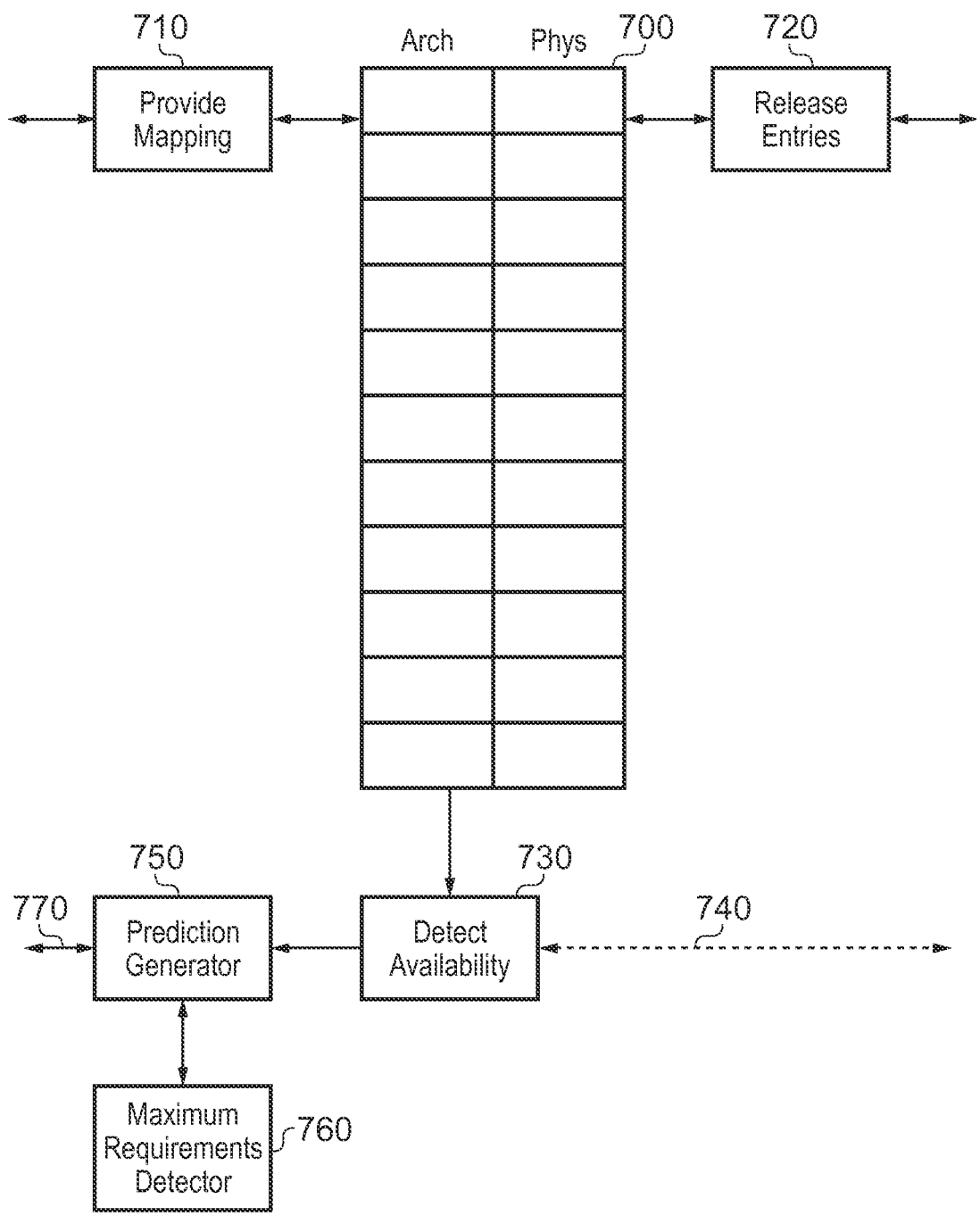
FIG. 7 schematically illustrates a renaming list and a detector.

FIG. 7 schematically illustrates an RNL list and a detector, as an example of at least part of the functionality of the dispatch circuitry such as the detector/controller circuitry 180. This provides an example of the detection of a prediction as to whether sufficient resources will be available to decode an instruction.

The RNL provides a mapping between architectural registers and physical registers. In an example, this is maintained as a table 700 with mapping logic 710 providing mappings when required for the decoding of an instruction, and logic 720 providing an indication to the RNL that a decoded instruction has been fully executed and the corresponding entries in the RNL can be released for further use.

An availability detector 730 detects how many entries in the RNL are currently available for allocation. In doing so, as indicated by a broken line 740, the availability detector 730 can take into account instructions in an execution pipeline for which the expectation is that those instructions will either reach a point of completion or will progress sufficiently far that entries in the RNL can be released in the next one or more cycles of the processor execution.

A prediction generator 750 is responsive to the detected availability (optionally taking into account the future predicted availability) and also to information provided by a maximum requirement detector 760. The maximum requirement detector is responsive to the nature of the instruction to be decoded, for example carrying out parsing of the instruction at a superficial level to detect the instruction type and, from the instruction type, the maximum number of architectural registers which may need to be mapped for an instruction of that instruction type.

The prediction generator 750 detects whether the maximum requirements are greater than the detected availability or future availability. If so, then a prediction 770 is provided that insufficient resources may be available for decoding of that instruction. If, however, the detected availability is greater than the maximum requirements, the prediction generator 750 generates a prediction that sufficient resources will be available.

Accordingly, in these examples, the prediction is either "may stall" or "definitely will not stall". However, other arrangements could be used.

Therefore, in these examples, the detection circuitry (such as the prediction generator 750 in cooperation with other parts shown in FIG. 7) is configured to detect the prediction by detecting, for an instruction to be dispatched, whether a maximum potential resource requirement of the instruction to be dispatched exceeds a minimum potential resource availability. For example, the detection circuitry may be configured to detect (by the availability detector 730) a minimum potential resource availability by detecting resources allocated to one or more decoded instructions awaiting execution.

In examples, the detection circuitry (for example, the availability detector 730) is configured to detect a minimum potential resource availability by detecting, of those resources allocated to one or more decoded instructions awaiting execution, any resources which will become available before decoding of the instruction awaiting dispatch. It may also (or instead) detect a minimum potential resource availability by detecting a maximum potential resource requirement of one or more dispatched instructions awaiting decoding, and/or one or more other instructions awaiting dispatch. This latter point relates to the fact that (in the present example arrangements) multiple instructions (for example, two instructions) can be dispatched as a single dispatch operation. Therefore, in assessing whether a stall may potentially occur, rather than considering each about-to-be-dispatched instruction individually, the potential resource requirements of the group of two (or more) instructions to be dispatched as a group are taken into account.

The maximum potential resource requirement of the instruction to be dispatched is (in examples) detected by the detector 760 in dependence upon an instruction type of the instruction to be dispatched.

The example given above is just one example of the way in which a prediction can be generated. In other examples, as well as (or instead of) detecting availability in the RNL, the prediction generator 750 and detector 730 can detect how many entries are free for allocation in the ROB and/or the RS. In the case of dual dispatch (two instructions dispatched at a single dispatch operation), if there are currently fewer than two free entries in either or both of the ROB and RS, a prediction can be made that there may not be sufficient resources available for allocation to the instructions to be dispatched.

In general terms, the prediction has some significant features which differentiate it from the stall indication 310 discussed above. A first difference is that the prediction may be incorrect. In the present examples, the prediction may suffer false negatives (a prediction of insufficient resources may prove to be incorrect) but not false positives (a prediction of sufficient resources is correct), but other arrangements could be used. Nevertheless, because the prediction is carried out in advance of an attempted decoding of the instructions, it does not have access to full information about the instructions and therefore may be incorrect. A second difference is that the prediction is obtained much earlier than the stall indication 310. If a prediction of (potentially) insufficient resource is obtained, this does not (in the present examples) prevent dispatch, but the dispatch process is varied so as to be carried out speculatively in such a way that if the instruction decoding is then cancelled, the dispatch can be retried without loss of information.

Figure 8:
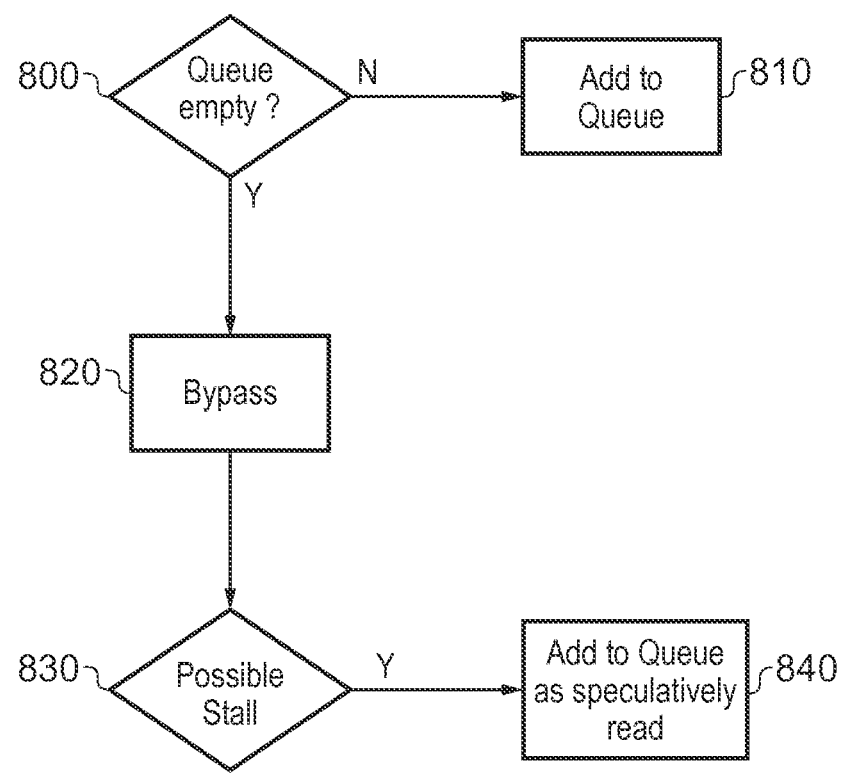
FIG. 8 is a schematic flowchart illustrating a bypass process.

FIG. 8 is a schematic flow chart illustrating a bypass process as carried out by the bypass controller 140.

At a fundamental level, and as discussed briefly above, the operation of the bypass controller is as follows. If an instruction queue (to which an instruction would otherwise be added) is empty, then there is no need to waste power and processor cycles by adding the instruction to the queue only for it to be read straight away from the queue. Instead, the bypass controller 140 can pass the instruction to one or both of the multiplexers 150, 160.

This part of the operation is referred to in FIG. 8 by a detection, at a step 800, as to whether the queue (to which the instruction would otherwise be added) is empty. If no, then at a step 810 the instruction is added to the queue. If yes, then at a step 820 the instruction is bypassed around the queue.

However, if instructions bypass the queue, this could circumvent the measures described above to retain a copy of an instruction in the queue, or at least to prevent its deletion, in instances in which a potential lack of allocatable resources has been detected. Accordingly, at a step 830, the detection (as to whether sufficient processor resources are predicted to be available for allocation to that instruction) is made using the techniques described above, and, if the result of the prediction is that insufficient processor resources are predicted to be available, then as well as bypassing the queue the instruction is added to the queue but marked as having been speculatively read using the arrangements discussed with reference to FIGS. 5a-6.

This therefore provides an example of queue arbiter circuitry configured, when a currently selected instruction queue is empty, to route a fetched instruction directly to the instruction decode circuitry; and also configured, in response to a prediction that insufficient processor resources are predicted to be available for allocation to that instruction by the instruction decode circuitry, to store a copy of that instruction in the instruction queue. In turn, the dispatch circuitry is configured, in respect of an instruction for which a copy has been stored in the instruction queue, to set a read pointer to a position indicating that the copy instruction is a next instruction to be dispatched and to set a speculative read pointer indicating a next instruction after the copy instruction; to move the read pointer to the position of the speculative read pointer in response to decoding of the copy instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing method comprising:
   storing fetched instructions in one or more instruction queues;
   decoding instructions dispatched from the one or more instruction queues, the decoding step comprising allocating one or more processor resources of a set of processor resources to a decoded instruction for use in execution of that decoded instruction;
   detecting, for an instruction to be dispatched from a given instruction queue, a prediction indicating whether sufficient processor resources are predicted to be available for allocation to that instruction by the decoding step;
   dispatching an instruction from an instruction queue for decoding; and
   retaining the dispatched instruction in that instruction queue when the prediction indicates that insufficient processor resources are predicted to be available for allocation to that instruction by the decoding step.

2. A method according to claim 1, comprising:
   allowing deletion of the dispatched instruction from the given instruction queue when the prediction indicates that sufficient processor resources are predicted to be available for allocation to that instruction by the decoding step.

3. Data processing circuitry comprising:
   instruction queue circuitry to maintain one or more instruction queues to store fetched instructions;
   instruction decode circuitry to decode instructions dispatched from the one or more instruction queues, the instruction decode circuitry being configured to allocate one or more processor resources of a set of processor resources to a decoded instruction for use in execution of that decoded instruction;
   detection circuitry to detect, for an instruction to be dispatched from a given instruction queue, a prediction indicating whether sufficient processor resources are predicted to be available for allocation to that instruction by the instruction decode circuitry; and
   dispatch circuitry to dispatch an instruction from the given instruction queue to the instruction decode circuitry, the dispatch circuitry being responsive to the detection circuitry to allow deletion of the dispatched instruction from that instruction queue when the prediction indicates that sufficient processor resources are predicted to be available for allocation to that instruction by the instruction decode circuitry, wherein the dispatch circuitry is configured to retain a dispatched instruction in that instruction queue when the prediction indicates that insufficient processor resources are predicted to be available for allocation to that instruction by the instruction decode circuitry.

4. Data processing circuitry according to claim 3, comprising:
two or more instruction queues; and
queue arbiter circuitry to select one of the instruction queues for a next instruction dispatch by the dispatch circuitry.

5. Data processing circuitry according to claim 4, in which the instruction decode circuitry is configured to stall the decoding of an instruction when insufficient processor resources are available for allocation to that instruction.

6. Data processing circuitry according to claim 5, in which the queue arbiter circuitry is configured, in response to an instruction from one of the instruction queues being stalled, to select another one of the instruction queues for instruction dispatch.

7. Data processing circuitry according to claim 6, in which the queue arbiter circuitry is configured to select another one of the instructions queues which has one or more instructions currently queued for dispatch.

8. Data processing circuitry according to claim 5, in which the instruction decode circuitry is configured to cancel decoding of a currently stalled instruction from one of the instruction queues in response to dispatch of an instruction from another of the instruction queues.

9. Data processing circuitry according to claim 3, in which the detection circuitry is configured to detect the prediction by detecting, for an instruction to be dispatched, whether a maximum potential resource requirement of the instruction to be dispatched exceeds a minimum potential resource availability.

10. Data processing circuitry according to claim 9, in which the detection circuitry is configured to detect a minimum potential resource availability by detecting resources allocated to one or more decoded instructions awaiting execution.

11. Data processing circuitry according to claim 10, in which the detection circuitry is configured to detect a minimum potential resource availability by detecting, of those resources allocated to one or more decoded instructions awaiting execution, any resources which will become available before decoding of the instruction awaiting dispatch.

12. Data processing circuitry according to claim 9, in which the detection circuitry is configured:
to detect a minimum potential resource availability by detecting a maximum potential resource requirement of one or more dispatched instructions awaiting decoding; and
to detect a maximum potential resource requirement of the instruction to be dispatched in dependence upon an instruction type of the instruction to be dispatched.

13. Data processing circuitry according to claim 9, in which the detection circuitry is configured:
to detect a minimum potential resource availability by detecting a maximum potential resource requirement of one or more other instructions awaiting dispatch; and
to detect a maximum potential resource requirement of the instruction to be dispatched in dependence upon an instruction type of the instruction to be dispatched.

14. Data processing circuitry according to claim 3, in which the dispatch circuitry is configured to allow deletion of the retained instruction in the given instruction queue in response to decoding of that instruction.

15. Data processing circuitry according to claim 3, in which the dispatch circuitry is configured to dispatch an instruction from an instruction queue to the instruction decode circuitry according to a read pointer indicating a read position in that instruction queue, the dispatch circuitry being responsive to the detection circuitry to set the read pointer to a position indicating that the dispatched instruction is a next instruction to be dispatched when the prediction indicates that insufficient processor resources are predicted to be available for allocation to that instruction by the instruction decode circuitry.

16. Data processing circuitry according to claim 15, in which the dispatch circuitry is configured to set a speculative read pointer indicating a next instruction after the dispatched instruction; and to move the read pointer to the position of the speculative read pointer in response to decoding of the dispatched instruction.

17. Data processing circuitry according to claim 5, in which:
the queue arbiter circuitry is configured, when a currently selected instruction queue is empty, to route a fetched instruction directly to the instruction decode circuitry; and
the queue arbiter circuitry is configured, in response to a prediction that insufficient processor resources are predicted to be available for allocation to that instruction by the instruction decode circuitry, to store a copy of that instruction in the instruction queue.

18. Data processing circuitry according to claim 17, in which the dispatch circuitry is configured, in respect of an instruction for which a copy has been stored in the instruction queue, to set a read pointer to a position indicating that the copy instruction is a next instruction to be dispatched and to set a speculative read pointer indicating a next instruction after the copy instruction; to move the read pointer to the position of the speculative read pointer in response to decoding of the copy instruction.

* * * * *